United States Patent [19]
Emmitte, Jr.

[11] Patent Number: 5,576,479
[45] Date of Patent: Nov. 19, 1996

[54] APPARATUS AND METHOD FOR PRESSURE TESTING A BODY HAVING A CHAMBER THEREIN

[76] Inventor: John P. Emmitte, Jr., 8418 Scranton, Houston, Tex. 77061

[21] Appl. No.: 413,546

[22] Filed: Mar. 30, 1995

[51] Int. Cl.⁶ .............................. G01M 3/00; G01M 3/02
[52] U.S. Cl. .................... 73/37; 73/40; 73/49.2; 73/49.5; 73/49.8; 73/49.1
[58] Field of Search ............................ 73/37, 49.6, 49.8, 73/40, 49.2, 49.5, 49.1

[56] References Cited

U.S. PATENT DOCUMENTS

| | | | |
|---|---|---|---|
| 4,126,034 | 11/1978 | Conrad | 73/49.8 |
| 4,698,999 | 10/1987 | Trick et al. | 73/49.8 |
| 4,813,456 | 3/1989 | Emmitte, Jr. | |

OTHER PUBLICATIONS

Brochure entitled "Model 1500–Patented Hydraulic Flange Seals" Calder Testers, Inc, 2 Pages.
Brochure entitled "Model 600 Series", Calder Testers Inc., 5 Pages.

*Primary Examiner*—Hezron E. Williams
*Assistant Examiner*—Daniel S. Larkin
*Attorney, Agent, or Firm*—Darin H. Duphorne; Ben D. Tobor

[57] ABSTRACT

An apparatus and method for pressure testing a body having a chamber by utilizing differential pressures to create a seal, whereby the body can be pressure tested without undesired forces being exerted upon the body.

3 Claims, 3 Drawing Sheets

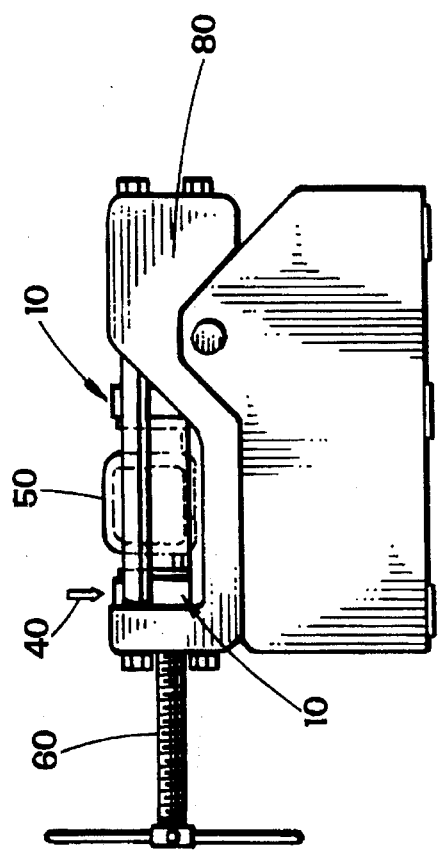
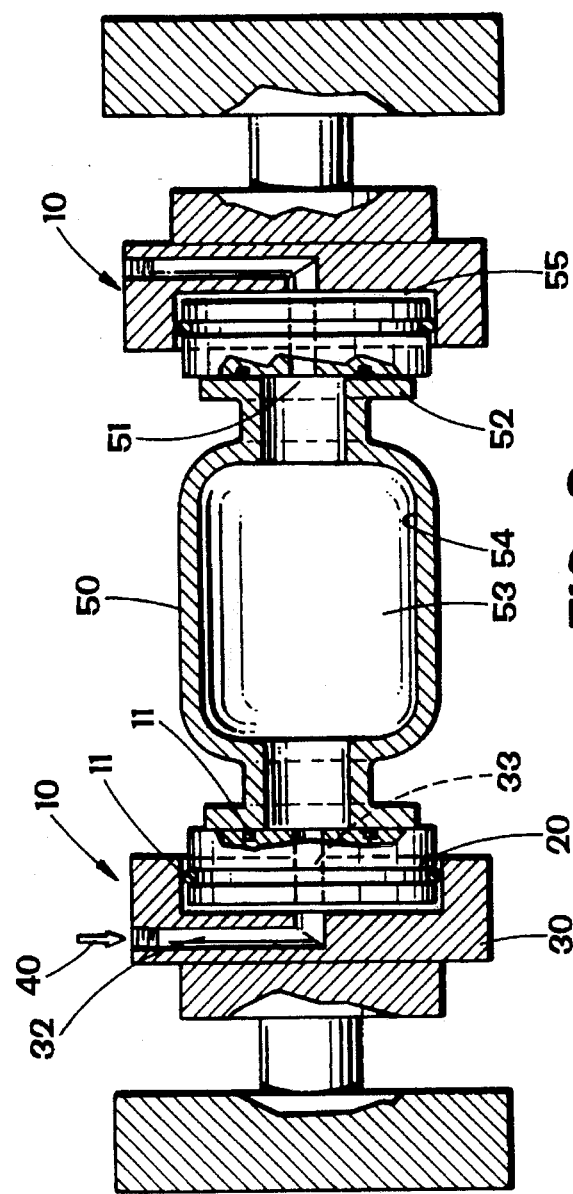
FIG. 1
FIG. 2

APPARATUS AND METHOD FOR PRESSURE TESTING A BODY HAVING A CHAMBER THEREIN

FIELD OF THE INVENTION

The invention relates to an apparatus and method for pressure testing a body having a chamber by utilizing differential pressures to create a seal, whereby the body can be pressure tested without undesired forces being exerted upon the body.

DESCRIPTION OF THE PRIOR ART

Mechanical and hydraulically operated flange seal clamps have been in use for many years, in connection with performing hydrostatic pressure testing, and pneumatic testing of flanged valves, flanged pipe, or any type of flanged fittings. Typically, such flange seal clamps utilize a seal plate which seals against the opening surrounded by the flange of the particular valve, pipe, or fitting. The seal plate is forced into a sealing relationship with the flange, as by a hydraulic ram, lead screw, or other suitable device.

When using either a hydraulic ram or a lead screw, standard "O" rings are depressed against the flange face gasket surface of the valve being tested to create a fluid tight seal joint. This "self energizing seal joint" is created when the "O" ring is deformed when pressure is applied. The seal joint thereby seals any gap of 0.020 inches or less.

Because the "O" ring cannot seal a gap greater than 0.020 inches the test machines have to be designed exceptionally large to keep stretching of the machine to this maximum overall movement of 0.020 inches. Typically, structural machine designs allow for movement and are designed by the stress values in the materials rather than using deflection formulas. Because movement cannot be tolerated in the design of pressure testing frames, deflection formulas must be used. This causes the frames to be much larger than is desired and therefore more expensive.

When using either a hydraulic ram or lead screw, the large forces required to clamp and seal the valve may distort the valve body and can either damage the valve being tested or seal otherwise leaking valves, thus decreasing the reliability of the test data.

Accordingly, prior to the development of the present invention, there has been no apparatus or method for pressure testing a body having a chamber, to permit hydrostatic pressure testing, which: is simple and economical to manufacture, is easily utilized, and avoids the undesired forces being exerted upon the body which can fracture or distort the valve body being tested. Therefore, the art has sought an apparatus or method for pressure testing a body having a chamber, to permit hydrostatic pressure testing, which is simple and economical to manufacture, is easily utilized, and avoids undesired forces being exerted upon the body which can fracture or distort the valve body being tested.

SUMMARY OF THE INVENTION

In accordance with the invention, the foregoing advantages have been achieved through the present apparatus and method for pressure testing a body having a chamber, to permit hydrostatic pressure testing of the valve. The present invention includes: a frame; a source of fluid pressure; a differential pressure seal for sealing at least one end of the body within the frame, the differential pressure seal being disposed in fluid communication with the source of fluid pressure, the differential pressure seal including at least one seal member having first and second ends, the seal member having a first sealing surface with a periphery associated with the first end of the seal member, the seal member having a second sealing surface with a periphery associated with the second end of the seal member, the surface area of the second sealing surface being greater than the surface area of the first sealing surface, the differential pressure seal further including a seal head having a receiving means, the differential pressure seal further includes a sealing means for providing a substantially fluid tight seal between the body and the seal member and between the seal member and the seal head, the sealing means allowing movement between the seal member and the seal head, the seal member being disposed for relative movement with respect to the seal head; and the source of fluid pressure being in fluid communication with a portion of the first sealing surface and the second sealing surface to provide a seal, whereby the body can be pressure tested without undesired forces being exerted upon the body. A feature of the present invention is that the forces applied to the valve body increase only as the test pressure is increased, thereby avoiding undesired forces being exerted upon the body which can fracture or distort the valve body being tested.

The apparatus and methods for pressure testing a body having a chamber, to permit hydrostatic pressure testing of the valve, when compared with previously proposed prior art seal clamps and test methods, have the advantages of being simple and economical to manufacture, are easily utilized, and avoids undesired forces being exerted upon the body which can fracture or distort the valve body being tested.

BRIEF DESCRIPTION OF THE DRAWINGS

In the drawings:

FIG. 1 is a front view of a valve being tested with a differential pressure seal, in accordance with the present invention, while supported in a frame having a lead screw providing a minimal initial seal.

FIG. 2 is a partial, cross-sectional front view of the differential pressure seal of the present invention being used to seal a flanged valve opening;

Figure 3:
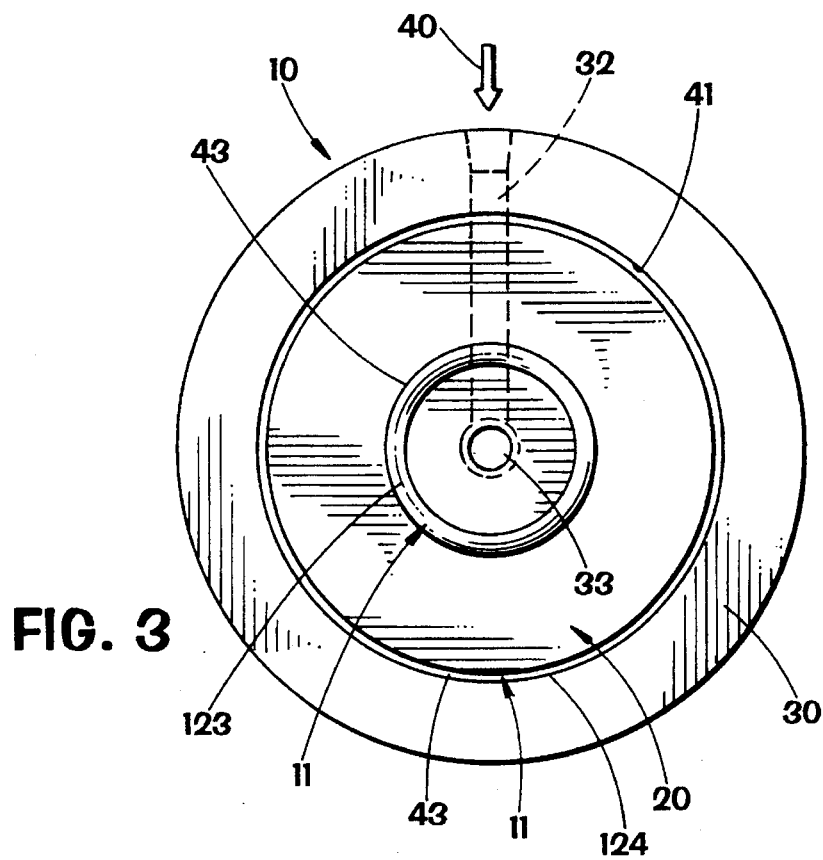
FIG. 3 is a side view of a portion of the differential pressure seal of the present invention taken along line 3—3 of FIG. 4.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

In FIGS. 1 and 2, a differential pressure seal 10, in accordance with the present invention is shown disposed adjacent to a valve, or body, 50 having an opening 51 surrounded by a conventional flange 52. In FIG. 1, the valve,]

or body, is being supported by and tested within a conventional testing frame 80. However, other methods of supporting the valve, or body, may be utilized. The use of the term "valve" throughout this specification and throughout the claims is intended to relate to any valve, pipe, or other type of fitting, having an opening, which is intended to be sealed and pressure tested. Further, the existence of a flange 52 is not required as the sealing means 11, as will be hereinafter described, could be modified to receive a valve, or body, 50 that does not have a flange 52. By sealing off the valve opening 51, the valve 50 may be hydrostatically tested, or pneumatically tested, as will be hereinafter described in further detail.

With reference to FIGS. 2–5, the differential pressure seal 10 of the present invention generally comprises: at least one seal member 20 having a first end 21 and a second end 22, the seal member 20 having a first, or member, sealing surface 23 with a periphery 123 associated with the first end of the seal member 21, the seal member 20 having a second sealing surface 24 with a periphery 124 associated with the second end 22 of the seal member 20, the surface area of the second, or seal head, sealing surface 24 being greater than the surface area of the first sealing surface 23; a seal head 30 having a means for receiving 31 at least one seal member 20; a sealing means 11 for providing a substantially fluid tight seal between the body 50 and the seal member 20 and between the seal member 20 and the seal head 30, the sealing means 11 allowing movement between the seal member 20 and the seal head 30, the seal member 20 being disposed for telescopic movement relative to the seal head 30. The differential pressure seal 10 is disposed in fluid communication with a conventional source of fluid pressure 40 via seal head conduit 32 and seal member conduit 33, as will be hereinafter described in greater detail. Preferably, the receiving means 31 is an annular recess 41 formed in seal head 30, which substantially mates with, and receives, the outer surface 42 of seal member 20, which preferably has a circular cross-sectional configuration, as seen in FIG. 3. Preferably sealing means 11 for sealing surface 23 and sealing means 11 between the outer surface 42 of seal member 20 and recess 41 of seal head 30 are conventional "O" rings 43 made of any suitable elastomeric material. Of course, other types of sealing means could be utilized provided they have the requisite strength and sealing characteristics to provide a seal between body 50 and seal member 20, and between seal member 20 and seal head 30. Furthermore, sealing means 11 could be formed as an integral seal unit, for example, with a layer of elastomeric material overlying sealing surface 23 and extending over the outer surface 42, or periphery 124, of seal member 20.

Figure 4:
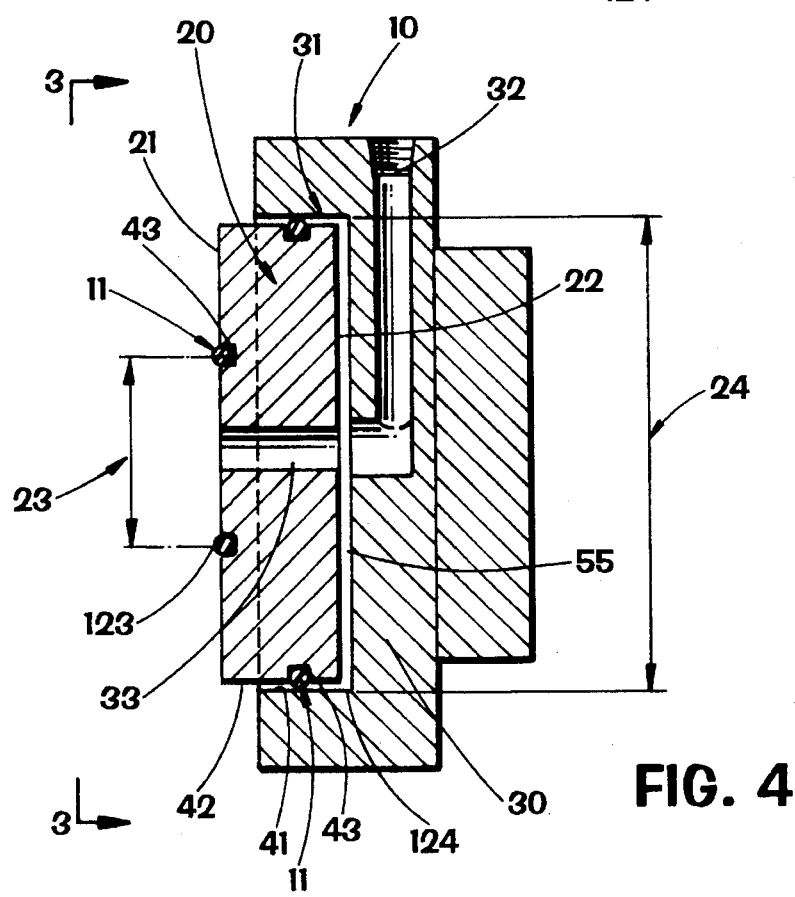
FIG. 4 is a partial, cross-sectional front view of the differential pressure seal of the present invention.

With reference to FIGS. 1, 2, and 4, a minimal force is applied to the differential pressure seal 10 by a lead screw 60, or other suitable means, to: support the valve body 50; to prevent separation of the differential pressure seal 10 from the valve body 50 during testing; and to provide an initial minimal fluid tight seal which allows the pressure source 40 to communicate with the chamber 53 of the valve body 50, the seal head sealing surface 24, and the member sealing surface 23. It should be noted that the minimal force applied by the lead screw 60 may not be necessary in a particular embodiment. The embodiment disclosed herein demonstrates the use of such a force. However, the present invention does not rely upon the external force in any way to create the pressure seal for pressure testing the body.

Accordingly, it should be apparent to one skilled in the art that there are other methods whereby one could support the valve, or body, 50 while maintaining communication between the chamber 53 of the valve, or body, 50, the seal head sealing surface 24, and the member sealing surface 23 while preventing separation of the differential pressure seal 10 from the valve body 50. For example, one could support the valve body 50 by a first means and provide a second means for maintaining the differential pressure seal 10 in contact with the valve body 50 and in communication with the chamber 53. Further, the initial fluid-tight seal required to allow activation of the differential pressure seal 10 by the testing pressure may be provided by any contact means such as a Belleville spring (not shown) disposed between the seal head and the seal member.

Returning to the preferred embodiment disclosed herein, after the minimal force is applied to the differential pressure seal 10, the pressure source 40 is connected in fluid communication with the differential pressure seal 10 and fluid pressure is applied to the chamber 53 of the valve body 50, thereby increasing the pressure inside the valve body 50 with respect to the atmospheric pressure outside the valve body 50. In a specific embodiment, the fluid pressure is provided by the fluid pressure source 40 by way of fluid communication between the seal head conduit 32 in the seal head 30, the seal head sealing surface 24, the seal head conduit 32, the member sealing surface 23 of the seal member 20, and the chamber 53 of the valve body 50. The fluid pressure communicates over the seal head sealing surface 24 by virtue of a gap 55 between the seal head 30 and the seal member 20. The gap 55 is present due to a lack of a metal-to-metal seal between the seal member 20 and the seal head 30. Further, the gap 55 may be increased or decreased dependent upon telescopic movement of the seal member 20.

As a result of the increased surface area of the seal head sealing surface 24 relative to the surface area of the member sealing surface 23, the pressure force applied to the seal plate sealing surface 24 by the increased fluid pressure acting thereon, will be greater than the counteracting pressure force similarly applied to the member sealing surface 23, thereby sealing chamber 53 of the valve body 50. As the pressure force exerted on both the chamber walls 54 and the seal plate 20 is increased by the source of fluid pressure 40, the sealing force provided by the differential pressure seal 10 increases accordingly, thus allowing variable pressure testing of the valve body while avoiding undesired sealing forces acting on the valve, or body, 50.

The operation of an embodiment of the present invention may be better understood by way of the following description of the forces involved, which is to be understood as being presented for illustrative purposes only. For example, if a valve body having a valve flange 52, having an opening 51 measuring 10 square inches is to be tested, a differential pressure seal may be selected having a first sealing surface 23 of 10 square inches in surface area and a second sealing surface 24 of 11 square inches in surface area. If the testing pressure is 1,000 pounds per square inch, the pressure forces exerted upon the second sealing surface 24 may be calculated by multiplying the testing pressure by the surface area of the second sealing surface 24. Hence, (1000 pounds per square inch)×(11 square inches) yields a pressure force of 11,000 pounds applied to the second sealing surface 24. Similarly, the pressure force exerted upon the first sealing surface 23 by the testing pressure may be calculated by multiplying the testing pressure by the surface area of the first sealing surface 23. Hence, (1000 pounds per square inch)×(10 square inches) yields 10,000 pounds. The resulting sealing force exerted upon the valve body 50 by the differential pressure seal 10 may be calculated by subtracting the pressure force acting on the first sealing surface 23 from the pressure force exerted upon the second sealing surface 24. Hence, (11,000 pounds)−(10,000 pounds) yields a sealing force of only 1,000 pounds being applied to the valve, or body 50, being tested.

In comparison, a conventional method of sealing a valve body 50 might require applying a mechanical sealing force to a conventional sealing plate (not shown) disposed in communication with the valve flange 52 and sized sufficient to seal the valve opening 51. The force required to mechanically seal the valve opening 51 may be calculated by multiplying the testing pressure by the surface area of the sealing plate in fluid communication with the valve opening 51. Again, for illustrative purposes only, if the valve flange 52 has an opening 51 measuring 10 square inches and the testing pressure is 1,000 pounds per square inch, the resulting sealing force required to seal the valve opening would be (1,000 pounds per square inch)×(10 square inches), or 10,000 pounds.

Hence, it may be shown that by utilizing a differential pressure seal 10, one may significantly reduce, if not eliminate, the undesired external sealing forces exerted upon the valve, or body 50.

It should be noted that the dimensions and pressures heretofore used are illustrative only and the exact dimensions used in a particular embodiment of a differential pressure seal may vary according to the size of valve, or body 50, being tested, the testing pressure desired, and other factors. Further, by varying the surface area of the first sealing surface 23 relative to the surface area of the second sealing surface 24, one may predict and control the sealing force acting on the valve body 50.

It should be further noted that the surface area of the second sealing surface 24 may be chosen such that the sealing force may be greater than the testing force, thereby increasing the undesired external forces. For example, if the surface area of the first sealing area is 10 square inches and the surface area of the second sealing surface is 25 square inches, the sealing force resulting from a testing pressure of 1,000 pounds per square inch may be (1,000 pounds per square inch ×25 square inches)−(1,000 pounds per square inch ×10 square inches), or 15,000 pounds.

Figure 5:
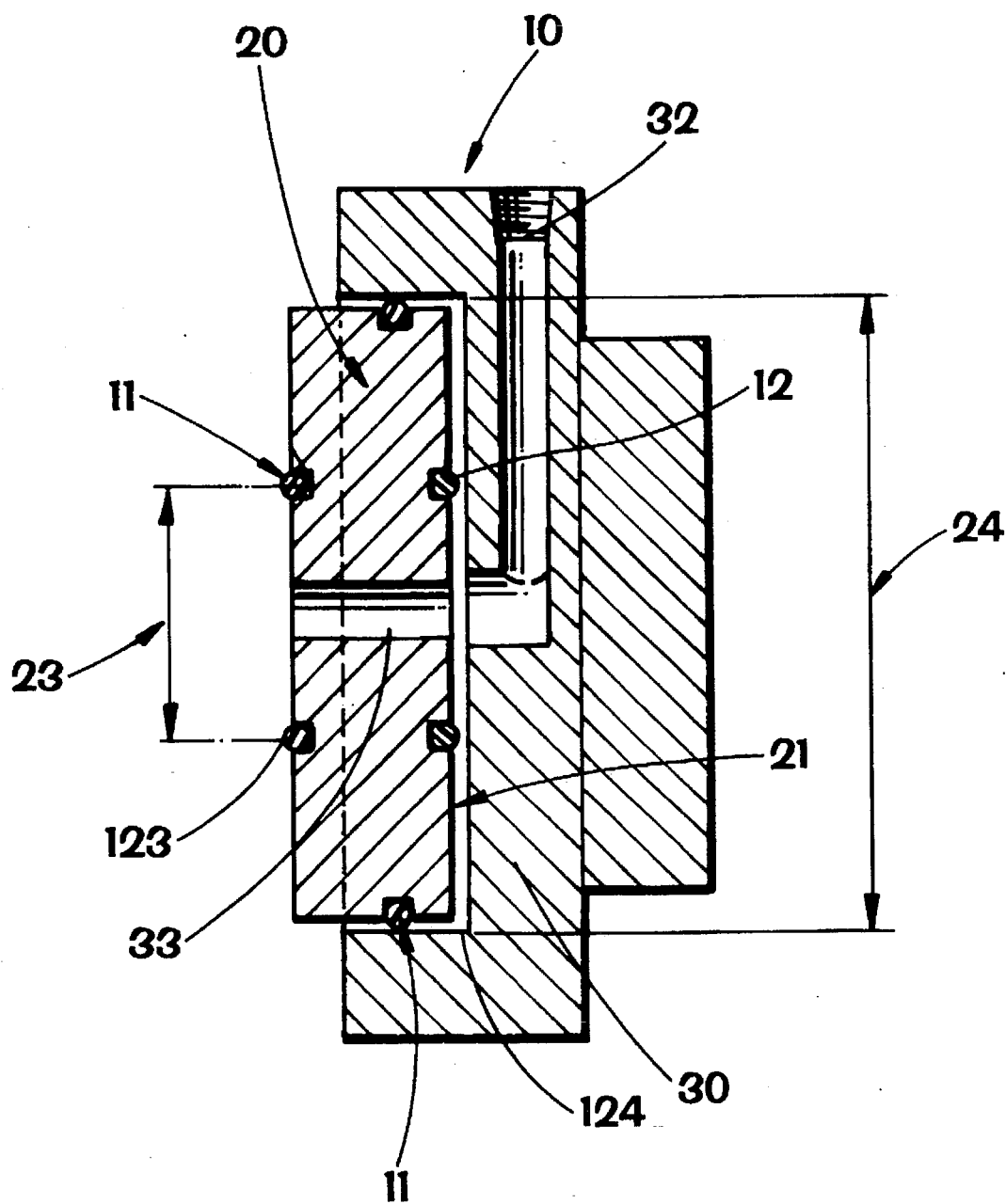
FIG. 5 is a partial, cross-sectional front view of the differential pressure seal of the present invention, showing first and second sealing surfaces having equal surface area.

With reference to FIG. 5, a sealing means 12 may be provided on the second end 22 of the seal member 20, defining a second sealing surface 124 having a surface area equal to the surface area of the first sealing surface 23. Therefore, the external sealing force exerted on the valve, or body 50, may be equal to the minimal force required to maintain the initial fluid-tight seal.

It is to be understood that the invention is not limited to the exact details of construction, operation, exact materials or embodiments shown and described, as obvious modifications and equivalents will be apparent to one skilled in the art; for example, the source of fluid pressure could be applied directly to the valve body itself, thereby eliminating the need for the seal head conduit; similarly, the source of fluid pressure could be applied via a plurality of differential pressure seals, one differential pressure seal provided for each valve, or body, opening; additionally, the source of fluid pressure need not be external to the valve body and could be provided from within the chamber of the valve body; additionally, rather than applying the differential pressure seal to the outside of a valve flange, the differential pressure seal could be applied within the valve body being tested; additionally, it should be apparent to one skilled in the art that the differential pressure seal could also be utilized in vacuum testing similar bodies simply by selecting the proper placement of the differential pressure seal with respect to the body and by selecting the proper arrangement and dimensions of the seal plate sealing surface and member sealing surface relative to the valve body. Accordingly, the invention is therefore to be limited only by the scope of the appended claims.

I claim:

1. An apparatus for pressure testing a body, the body having a chamber therein and at least one end, comprising:
   (a) a frame;
   (b) a source of fluid pressure; and
   (c) a differential pressure seal for sealing at least one end of the body within the frame, disposed in fluid communication with the source of fluid pressure and including:
      (1) at least one seal member having first and second ends, a first sealing surface with a surface area and a periphery associated with the first end of the seal member, a second sealing surface with a periphery associated with the second end of the seal member, and an outer surface, the second sealing surface having a surface area greater than the surface area of the first sealing surface, a recess in the first sealing surface for removably receiving an elastomeric O-ring, a recess in the outer surface of the seal member for removably receiving an elastomeric O-ring, a seal member conduit disposed between the first sealing surface and the second sealing surface to provide fluid communication between the source of fluid pressure and the body chamber, and an elastomeric sealing ring disposed in the recess of the first sealing surface of the seal member for providing a substantially fluid tight seal between the seal member and the body to be tested,
      (2) a seal head having an annular recess formed centrally in the seal head, which substantially mates with, and receives, the outer surface of the seal member, and a seal head conduit disposed between the annular recess and the source of fluid pressure to provide fluid communication between the source of fluid pressure and the annular recess, and
      (3) an elastomeric sealing ring disposed in the recess of the outer surface of the seal member for providing a substantially fluid tight seal between the seal member and the seal head, for allowing telescopic movement between the seal member and the seal head, and for allowing separation of the seal member from the seal head, the source of fluid pressure being disposed in fluid communication with a portion of the first sealing surface and the second sealing surface to provide a seal, whereby the body can be pressure tested without undesired forces being exerted upon the body.

2. The apparatus of claim 1, wherein the elastomeric sealing ring is an elastomeric O-ring.

3. A method for sealing a body to be pressure tested, the body having a chamber therein, and at least one end, comprising the steps of:
   (a) providing a source of fluid pressure;
   (b) providing at least one end of the body with a differential pressure seal, and providing at least one seal member with first and second ends, a first sealing surface with a surface area and a periphery associated with the first end of the seal member, a second sealing surface with a periphery associated with the second end of the seal member, and an outer surface; providing the second sealing surface with a surface area greater than the surface area of the first sealing surface; providing a recess in the first sealing surface for removably receiving an elastomeric O-ring; providing a recess in the outer surface of the seal member for removably receiving an elastomeric O-ring; dispensing a seal member conduit between the first sealing surface and the second sealing surface to provide fluid communication between the source of fluid pressure and the body chamber; disposing an elastomeric O-ring in the recess of the first sealing surface of the seal member for providing a substantially fluid tight seal between the seal member and the body to be tested; providing a seal head with an annular recess formed centrally in the seal head, which substantially mates with, and receives, the outer surface of the seal member; providing a seal head conduit disposed between the annular recess and the source of fluid pressure to provide fluid communication between the source of fluid pressure and the annular recess; and disposing an elastomeric O-ring in the recess of the outer surface of the seal member for providing a substantially fluid tight seal between the seal member and the seal head, for allowing telescopic movement between the seal member and the seal head, and for allowing separation of the seal member from the seal head;

(c) providing a minimal force to the differential pressure seal to provide an initial minimal fluid tight seal to allow the source of fluid pressure to communicate with the chamber of the valve body, the seal head sealing surface, and the member sealing surface;

(d) connecting the source of fluid pressure in fluid communication with the differential pressure seal; and (e) applying fluid pressure to the chamber of the valve body, thereby increasing the pressure inside the valve body with respect to the atmospheric pressure outside the valve body, whereby the pressure forces acting on the differential surface areas of the seal member provide a seal, thereby allowing the sealing force to increase proportionately to the testing pressure so that the body can be pressure tested without undesired forces being exerted upon the body.

* * * * *